United States Patent [19]

Kirker et al.

[11] Patent Number: 5,219,814
[45] Date of Patent: Jun. 15, 1993

[54] CATALYST FOR LIGHT CYCLE OIL UPGRADING

[75] Inventors: Garry W. Kirker, Sewell; Michael E. Landis, Woodbury, both of N.J.; Daria N. Lissy, Glen Mille, Pa.; Sadi Mizrahi, Cherry Hill, N.J.; Michael S. Sarli, Haddonfield, N.J.; Stuart S. Shih, Cherry Hill, N.J.

[73] Assignee: Mobil Oil Corporation, Fairfax, Va.

[21] Appl. No.: 629,952

[22] Filed: Dec. 19, 1990

[51] Int. Cl.⁵ .................... B01J 29/10; B01J 29/16
[52] U.S. Cl. .................................... 502/66; 502/74
[58] Field of Search ............................. 502/66, 74

[56] References Cited

U.S. PATENT DOCUMENTS

| | | | |
|---|---|---|---|
| 3,259,564 | 7/1966 | Kimberlin, Jr. | 502/66 |
| 3,269,934 | 8/1966 | Hansford | 502/66 |
| 3,472,793 | 10/1969 | Pollitzer et al. | 502/66 |
| 3,597,349 | 8/1971 | Bertolacini et al. | 502/66 |
| 4,676,887 | 6/1987 | Fischer et al. | 208/61 |
| 4,738,766 | 4/1988 | Fischer et al. | 208/68 |
| 4,789,457 | 12/1988 | Fischer et al. | 208/89 |
| 4,828,677 | 5/1989 | Fischer et al. | 208/89 |

Primary Examiner—Carl F. Dees
Attorney, Agent, or Firm—Alexander J. McKillop; Malcolm D. Keen; Marina V. Schneller

[57] ABSTRACT

A moderate pressure hydrocracking process in which a highly aromatic, substantially dealkylated feedstock is processed to high octane gasoline and low sulfur distillate by hydrocracking over a catalyst, preferably comprising ultrastable Y and a Group VIII metal and a Group VI metal, in which the amount of the Group VIII metal content is incorporated at specified proportion into the framework aluminum content of the ultrastable Y component. The feedstock which is preferably a light cycle oil has an aromatic content of at least 50, usually at least 60 percent, and an API gravity not more than 25. The hydrocracking typically operates at 400–1000 psig at moderate to high conversion levels to maximize the production of monocyclic aromatics which provide the requisite octane value to the product gasoline. The distillate products from the hydrocracker are reduced in their sulfur content.

15 Claims, 3 Drawing Sheets

CATALYST FOR LIGHT CYCLE OIL UPGRADING

FIELD OF THE INVENTION

The invention relates to a catalyst for upgrading a light cycle oil to high octane gasoline and low sulfur distillate. The catalyst for this process comprises a Group VI and a Group VIII metal on ultrastable Y; preferably, the catalyst is supported on a binder.

Light cycle oil is a highly aromatic material containing sulfur compounds that are relatively difficult to remove by catalytic hydrodesulfurization. Light cycle oil upgrading considerations include not only the gasoline product but also reduction of the sulfur content to less than 0.05 weight percent for the distillate fraction.

In accordance with the invention, the catalyst effectively balances the requirements for gasoline and distillate quality with catalyst activity. In the catalyst of the invention the Group VIII metal component content is controlled to be directly proportional to the zeolitic aluminum content of the ultrastable Y.

BACKGROUND OF THE INVENTION

Under present conditions, petroleum refineries are finding it necessary to convert increasingly greater proportions of crude to premium fuels such as gasoline and middle distillates such as diesel and jet fuel. Catalytic cracking processes, exemplified by the fluid catalytic cracking (FCC) process and Thermofor catalytic cracking (TCC) process together, account for a substantial fraction of heavy liquids conversion in modern refineries. Both are thermally severe processes which result in a rejection of carbon to coke and to residual fractions; during catalytic cracking high molecular weight liquids disproportionate into relatively hydrogen-rich light liquids and aromatic, hydrogen-deficient heavier distillates and residues.

Catalytic cracking in the absence of hydrogen does not provide significant desulfurization nor is the nitrogen content of the feed selectively rejected with the coke. Both sulfur and nitrogen therefore concentrate appreciably in the heavier cracking products. Catalytic cracking therefore produces significant quantities of highly aromatic, hydrogen-deficient middle and heavy distillates that have high sulfur and nitrogen levels. Recycling these liquids to the catalytic cracker is often not an attractive option, because they are refractory and difficult to convert and often will impair conversion of the less refractory fresh feed. Generally, the level of heteroatom contaminants increases with the boiling point of the fraction, as shown in Table 1 below which gives the sulfur and nitrogen contents for two FCC product fractions, a light cycle oil and an FCC main column bottoms (proportions and percentages by weight, as in the remainder of this specification unless the contrary is stated).

TABLE 1

| FCC Product Fractions | | | | |
|---|---|---|---|---|
| | Aromatics pct. | S, pct. | N, ppm | H, pct. |
| Light Cycle Oil (LCO) | 80 | 3.1 | 650 | 9.1 |
| Main Column Bottoms | 80 | 4.6 | 1500 | 6.8 |

Present market requirements make refractory product streams such as these particularly difficult to dispose of as commercially valuable products. Formerly, the light and heavy cycle oils could be upgraded and sold as light or heavy fuel oil, such as No. 2 fuel oil or No. 6 fuel oil. Upgrading the light cycle oil was conventionally carried out by a relatively low severity, low pressure catalytic hydro-desulfurization (CHD) unit in which the cycle stock would be admixed with virgin mid-distillates from the same crude blend fed to the catalytic cracker.

Currently, however, the refiner is finding a diminished demand for fuel oil. At the same time, the impact of changes in supply and demand for petroleum has resulted in a lowering of the quality of the crudes available to the refiner; this has resulted in the formation of an even greater quantity of refractory cycle stocks. As a result, the refiner is left in the position of producing increased amounts of poor quality cycle streams from the catalytic cracker while having a diminishing market in which to dispose of these streams.

At many petroleum refineries, the light cycle oil (LCO) from the FCC unit is a significant component of the feed to the catalytic hydrodesulfurization (CHD) unit which produces No. 2 fuel oil or diesel fuel. The remaining component is generally virgin kerosene taken directly from the crude distillation unit. The highly aromatic nature of LCO, particularly when the FCC unit is operated in the maximum gasoline mode, increases operational difficulties for the CHD and can result in a product having marginal properties for No. 2 fuel oil or diesel oil, as measured by cetane numbers and sulfur content.

An alternative market for mid-distillate streams is automotive diesel fuel. However, diesel fuel has to meet a minimum cetane number specification of about 45 in order to operate properly in typical automotive diesel engines. Because cetane number correlates closely and inversely with aromatic content, the highly aromatic cycle oils from the cracker typically with aromatic contents of 80% or even higher have cetane numbers as low as 4 or 5. In order to raise the cetane number of these cycle stocks to a satisfactory level by the conventional CHD technology described above, substantial and uneconomic quantities of hydrogen and high pressure processing would be required.

Because of these problems associated with its use as a fuel, recycle of untreated light cycle oil to the FCCU has been proposed as a method for reducing the amount of LCO. Benefits expected from the recycle of LCO include conversion of LCO to gasoline, backout of kerosene from No. 2 fuel oil and diminished use of cetane improvers in diesel fuel. However, in most cases, these advantages are outweighed by disadvantages, which include increased coke make in the FCC unit, diminished quality of the resultant LCO and an increase in heavy cycle oil and gas.

A typical LCO is such a refractory stock and of poor quality relative to a fresh FCC feed that most refineries do not practice recycle of the untreated LCO to any significant extent. One commonly practiced alternative method for upgrading the LCO is to severely hydrotreat prior to recycle to the catalytic cracker or, alternatively, to severely hydrotreat and feed to a high pressure fuels hydrocracker. In both such cases, the object of hydrotreating is to reduce the heteroatom content to low levels while saturating polyaromatics to increase crackability. Although this does enhance the convertibility of these aromatic streams considerably, the economic penalties derived from high hydrogen consumptions and high pressure processing are severe. In addition, in those instances where the production of gasoline is desired, the naphtha may require reforming to recover its aromatic character and meet octane specifications.

Hydrocracking may be used to upgrade the higher-boiling more refractory products derived from catalytic cracking. The catalytic cracker is used to convert the more easily cracked paraffinic gas oils from the distillation unit while the hydrocracker accepts the dealkylated, aromatic cycle oils from the cracker and hydrogenates and converts them to lighter oils. These hydrocracking processes using catalytically cracked feeds either on their own or mixed with virgin feeds have, however, generally been incapable of producing high octane gasoline directly. The reason for this is that they have conventionally been operated at high hydrogen pressures and at relatively high conversion levels so as to maximize the saturation of the aromatics (especially the refractory polynuclear aromatics), removal of heteroatoms in inorganic form and the subsequent conversion of the hydrogenated aromatics to paraffins. While this may produce acceptable diesel fuel (which benefits from the presence of n-paraffins) the octane quality of the gasoline has generally been poor as a consequence of the large quantities of low octane paraffin components. For present day use these gasolines will require extensive reforming with its consequent yield loss in order to conform to market product specifications.

Various low pressure hydrocracking processes have also been described. For example, U.S. Pat. Nos. 3,867,277 and 3,923,640 disclose low pressure hydrocracking processes using various high boiling feedstocks, generally of high (20-40) API gravity. The use of such feeds, coupled with the relatively high levels of conversion in those processes leads to naphthas of low octane rating since the alkyl groups present in the feeds come through into the naphtha together with the relatively straight chain paraffins produced by the ring opening and cracking of the aromatics. These processes have therefore been unsatisfactory for the direct production of high octane gasoline.

Other low pressure hydrocracking processes producing aromatic products have been described in the past but their potential for producing high octane gasoline from low value, refractory cracking oils has not been appreciated. For example, U.S. Pat. No. 4,435,275 describes a method for producing aromatic middle distillates such as home heating oil from high gravity feeds under relatively low conversion conditions but with the objective of producing low-sulfur middle distillates, octane numbers of only about 78 (R+0) are reported.

Because highly aromatic feeds, described above, contain relatively bulky bicyclic and polycyclic components the catalyst should have a pore size which is sufficiently large to admit these materials to the interior structure of the catalyst where cracking can take place. It is noted that the amorphous hydrocracking catalysts such as alumina and silica-alumina are aromatic selective and have a large pore size, although they are not preferred. A pore size of at least about 7.4 Angstroms (corresponding to the pore size of the large pore size zeolites X and Y) is sufficient for this purpose but because the end point of the feed is limited, the proportion of bulky, polynuclear aromatics is quite low and for this reason, very large pore sizes greatly exceeding those previously mentioned are not required. Crystalline zeolite catalysts which have a relatively limited pore size range, as compared to the so-called amorphous materials such as alumina or silica-alumina, may therefore be used to advantage in view of their activity and resistance to poisoning. Catalysts having aromatic selectivity, i.e. which will crack aromatics in preference to paraffins are preferred because of the highly aromatic character of the feed.

Preferred hydrocracking catalysts, for the foregoing feeds, are the crystalline catalysts, generally the zeolites, and, in particular, the large pore size zeolites having a Constraint Index less than 2. For purposes of this invention, the term "zeolite" is meant to represent the class of porotectosilicates, i.e., porous crystalline silicates, that contain silicon and oxygen atoms as the major components. Other components are also present, including aluminum, gallium, iron, boron and the like, with aluminum being preferred in order to obtain the requisite acidity. Minor components may be present separately, in mixtures in the catalyst or intrinsically in the structure of the catalyst.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g., less than 5 Angstroms. On the other hand, zeolites which provide relatively free access to the internal zeolite structure have a low value for the Constraint Index and usually pores of large size, e.g., greater than 8 Angstroms. The method by which Constraint Index is determined is described fully in U.S. Pat. No. 4,016,218, to which reference is made for details of the method. A Constraint Index of less than 2 and preferably less than 1 is a characteristic of the hydrocracking catalysts used in the present process.

Constraint Index (CI) values for some typical large pore materials are shown in Table 2 below:

TABLE 2

| | Constraint Index |
|---|---|
| | CI (Test Temperature) |
| ZSM-4 | 0.5 (316° C.) |
| ZSM-20 | 0.5 (371° C.) |
| TEA Mordenite | 0.4 (316° C.) |
| Mordenite | 0.5 (316° C.) |
| REY | 0.4 (316° C.) |
| Amorphous Silica-Alumina | 0.6 (538° C.) |
| Dealuminized Y (Deal Y) | 0.5 (510° C.) |
| Zeolite Beta | 0.6-2 (316°-399° C.) |

The nature of the CI parameter and the technique by which it is determined admit of the possibility that a given zeolite can be tested under somewhat different conditions and thereby exhibit different Constraint Indices. Constraint Index may vary with severity of operation (conversion) and the presence or absence of binders. Other variables, such as crystal size of the zeolite, the presence of occluded contaminants, etc., may also affect the Constraint Index. It may be possible to so select test conditions, e.g., temperatures, as to establish more than one value for the Constraint Index of a particular zeolite, as with zeolite beta. A zeolite is considered to have a Constraint Index within the specified range if it can be brought into the range under varying conditions.

The large pore zeolites, i.e., those zeolites having a Constraint Index less than 2 have a pore size sufficiently large to admit the vast majority of components normally found in the feeds. These zeolites are generally stated to have a pore size in excess of 7 Angstroms and are represented by zeolites having the structure of, e.g., Zeolite Beta, Zeolite X, Zeolite Y, Faujasite, Ultrastable Y (USY), Dealuminized Y (Deal Y), Mordenite, ZSM-3, ZSM-4, ZSM-18 and ZSM-20. Zeolite ZSM-20 resembles faujasite in certain aspects of structure, but has a notably higher silica/alumina ratio than faujasite, as do the various forms of zeolite Y, especially USY and De-AlY. Zeolite Y is the preferred catalyst, and it is preferably used in one of its more stable forms, especially USY or De-AlY.

Zeolite ZSM-4 is described in U.S. Pat. No. 3,923,639; Zeolite ZSM-20 in U.S. Pat. No. 3,972,983; Zeolite Beta in U.S. Pat. Nos. 3,308,069 and Re 28,341; Low sodium Ultrastable Y molecular sieve (USY) is described in U.S. Pat. Nos. 3,293,192 and 3,449,070; Dealuminized Y zeolite (Deal Y) may be prepared by the method found in U.S. Pat. No. 3,442,795; and Zeolite UHP-Y is described in U.S. Pat. No. 4,401,556. Reference is made to these patents for details of these zeolite catalysts.

SUMMARY OF THE INVENTION

The hydrocracking catalyst of the invention comprises a Group VIII metal and a Group VI metal on ultrastable Y; preferably, the catalyst composition includes a binder or a matrix material. More specifically, the amount of the Group VIII metal is controlled so that it is present in the catalyst composition in an amount which is directly proportional to the zeolitic framework aluminum contained in the ultrastable Y. In catalytic cracking of light cycle oil, this catalyst offers the dual benefit of high quality gasoline, with a RON of greater than about 90, and a low sulfur content distillate.

The hydrocracking is operated under low to moderate pressure, typically 400–1000 psig (about 2860–7000 kPa) hydrogen pressure. At the relatively low severity conditions employed temperatures will generally be in the range 600°–850° F. (315°–455° C.), more typically 700°–800° F. (370°–425° C.), with space velocity adjusted to obtain the desired conversion.

DETAILED DESCRIPTION

The Hydrocracking Catalyst

The hydrocracking catalyst of the invention is a bifunctional, heterogeneous, porous solid catalyst possessing acidic and hydrogenation-dehydrogenation functionality.

The hydrocracking catalyst of the invention comprises a Group VIII metal, a Group VI metal, and ultrastable Y; preferably, the catalyst composition includes a binder or a matrix material. More specifically, the amount of the Group VIII metal is controlled so that it is present in the catalyst composition in an amount which is directly proportional to the zeolitic framework aluminum contained in the ultrastable Y. In catalytic cracking of light cycle oil, this catalyst offers the dual benefit of high quality gasoline, with a RON of greater than about 90, and a low sulfur content distillate.

The hydrocracking catalyst contains metal component(s) to provide hydrogenation-dehydrogenation functionality. Suitable hydrogenation components include at least one metal of Group VI and at least one metal of Group VIII such as tungsten, molybdenum, nickel, cobalt, chromium, in an amount between 0.5 and about 25 wt %, normally 1 to 20 wt %, and preferably 1 to 10 wt %. Preferably, the combined weight of the Group VIII metal and Group VI metal is 3 to 15 weight percent of the catalyst. The most preferred Group VIII metals include nickel and cobalt, while the most preferred Group VI metals include tungsten and molybdenum. Accordingly, metal components, especially nickel-tungsten and nickel-molybdenum, cobalt-tungsten and cobalt-molybdenum are particularly preferred in the present invention. These components can be exchanged or impregnated into the composition or added via other methods well known to those skilled in the art, using suitable compounds of the metals. The compounds used for incorporating the metal component into the catalyst can usually be divided into compounds in which the metal is present in the cation of the compound or compounds in which it is present in the anion of the compound. Compounds which contain the metal as a neutral complex may also be employed. The compounds which contain the metal in the ionic state are generally used.

The original cations associated with the crystalline ultrastable Y herein may be replaced by the cations, according to conventional techniques. Typical replacing cations including hydrogen, ammonium and metal cations, including mixtures of these cations. Typical ion-exchange techniques are to contact the particular zeolite with a salt of the desired replacing cation. Although a wide variety of salts can be employed, particular preference is given to chlorides, nitrates and sulfates. Representative ion-exchange techniques are disclosed in a wide variety of patents, including U.S. Pat. Nos. 3,140,249; 3,140,251; and 3,140,253.

Following contact with a solution of the desired replacing cation, the zeolite containing catalyst is then preferably washed with water and dried at a temperature ranging from 150° to about 600° F. (65°–315° C.), and thereafter calcined in air, or other inert gas, at temperatures ranging from about 500° to 1500° F. (260°–815° C.) for periods of time ranging from 1 to 48 hours or more.

In accordance with the invention, the Group VIII metal is present in the composition in an amount directly proportional to the framework aluminum content of the ultrastable Y. The ultrastable Y has a silica:alumina framework molar ratio exceeding about 5. The catalyst should have some acidic functionality, i.e., an alpha value greater than 1 for the cracking function. The alpha value, a measure of zeolite acidic functionality, is described together with details of its measurement in U.S. Pat. No. 4,016,218 and in *J. Catalysis*, 61, p. 395 (1980) and reference is made to these for such details.

Catalyst stability during the extended cycle life is essential and this may be conferred by suitable choice of catalyst structure and composition, especially silica:alumina ratio. This ratio may be varied by initial zeolite synthesis conditions, or by subsequent dealuminization as by steaming or by substitution of framework aluminum with other trivalent species such as boron, iron or gallium. The alkali metal content should be held at a low value, preferably below 1% and lower, e.g. below 0.5% Na. This can be achieved by successive sequential ammonium exchange followed by calcination.

It has been found that preferred catalysts for this process require controlled metal/acid ratios. Furthermore, this can be described by the ratio of Group VIII metal to the zeolite framework Al content. The molar ratio of Group VIII metal:framework aluminum (provided by the ultrastable Y), in the catalyst of the invention, is less than 2. Generally, that ratio ranges from 0 to 1. Preferably, the Group VIII metal:framework aluminum ratio (provided by the ultrastable Y), in the catalyst of the invention, ranges from 0.1 to 0.8. The parameter of Group VIII metal:framework aluminum ratio (provided by the ultrastable Y), in the catalyst of the invention, maximizes catalytic conversion to high octane gasoline and maximizes the quality of the distillate, in terms of sulfur content. Thus, the catalyst exhibits excellent activity for conversion of light cycle oil to gasoline and for maximum desulfurization activity, with respect to the distillate bottoms product.

Preferably, the catalyst composition includes a matrix comprising another material, other than the ultrastable Y, resistant to the temperature and other conditions employed in the process. The matrix material is useful as a binder and imparts greater resistance to the catalyst for the severe temperature, pressure and reactant feed stream velocity conditions encountered in the process. Useful matrix materials include both synthetic and naturally occurring substances, such as clay, silica, alumina, silica-alumina, zirconia and/or metal oxides. The latter may be either naturally occurring or in the form of synthetic gelatinous precipitates or gels including mixtures of silica and metal oxides such as alumina and silica-alumina. The matrix may be in the form of a cogel. Naturally occurring clays which can be composited with the zeolite include those of the montmorillonite and kaolin families. Such clays can be used in the raw state as originally mined or initially subjected to calcination, acid treatment or chemical modification. The relative proportions of zeolite component and the matrix, on an anhydrous basis, may vary widely with the zeolite content ranging from between about 1 to about 99 wt %, and more usually in the range of about 5 to about 80 wt % of the dry composite. The binder is preferably composited with the zeolite prior to treatments such as steaming, impregnation, exchange, etc., in order to preserve mechanical integrity.

The catalysts of the invention are valuable from a refiner's perspective because they provide high activity for producing high quality gasoline from light cycle oils, which are low value byproducts of catalytic cracking of gas oils. As an additional benefit, these catalysts exhibit high hydrodesulfurization activity and can remove sulfur to less than 0.05 weight percent in the distillate product. Thus these catalysts offer the dual benefit of high quality gasoline product (greater than 90 RON) and low sulfur in the distillate.

THE PROCESS OF THE INVENTION

In the embodiments herein the process of the invention is a single catalyst one stage process. However, a two stage dual-catalyst system, employing a hydrotreating catalyst and the catalyst of the invention, can be employed, if it is found to be beneficial. In such a two stage process, the two catalysts are in sequential beds and the process is operated in the cascade mode without interstage separation to remove ammonia and hydrogen sulfide.

FEEDSTOCK

The feeds used in the present process are hydrocarbon fractions which are highly aromatic and hydrogen deficient. They are fractions which have been substantially dealkylated, as by a catalytic cracking operation, for example, in an FCC or TCC unit. It is a characteristic of catalytic cracking that the alkyl groups, generally bulky, relatively large alkyl groups (typically but not exclusively $C_5$–$C_9$ alkyls), which are attached to aromatic moieties in the feed become removed during the course of the cracking. It is these detached alkyl groups which lead to the bulk of the gasoline product from the cracker. The aromatic moieties such as benzene, naphthalene, benzothiophenes, dibenzothiophenes and polynuclear aromatics (PNAs) such as anthracene and phenanthrene form the high boiling products from the cracker. The mechanisms of acid-catalyzed cracking and similar reactions remove side chains of greater than 5 carbons while leaving behind short chain alkyl groups, primarily methyl, but also ethyl groups on the aromatic moieties. Thus, the "substantially dealkylated" cracking products include those aromatics with small alkyl groups, such as methyl, and ethyl, and the like still remaining as side chains, but with relatively few large alkyl groups, i.e., the $C_5$–$C_9$ groups, remaining. More than one of these short chain alkyl groups may be present, for example, one, two or more methyl groups.

Feedstocks of this type have an aromatic content in excess of 50 wt. percent; for example, 70 wt. percent or 80 wt. percent or more, aromatics. Highly aromatic feeds of this type typically have hydrogen contents below 14 wt. percent, usually below 12.5 wt. percent or even lower, e.g. below 10 wt. percent or 9 wt. percent. The API gravity is also a measure of the aromaticity of the feed, usually being below 30 and in most cases below 25 or even lower, e.g. below 20. In most cases the API gravity will be in the range 5 to 25 with corresponding hydrogen contents from 8.5–12.5 wt. percent. Sulfur contents are typically from 0.5–5 wt. percent and nitrogen from 50–1000 ppmw, more usually 50–650 ppmw.

Suitable feeds for the present process are substantially dealkylated cracking product fractions. Suitable feeds of this type include cycle oils from catalytic cracking units. Full range cycle oils may be used, for example, full range light cycle oils with a boiling range of 385°–750° F. (about 195°–400° C.), e.g., 400°–700° F. (about 205°–370° C.) or, alternatively, cycle oil fractions may be employed such as heavy cycle oil or light cycle oil fractions. When operating with an extended boiling range feed such as a full range light cycle oil (FRLCO), conversion should be limited so as to avoid excessive catalyst aging as well as to produce a high octane product; a maximum conversion of 50% to lower boiling products is preferred. However, if a light cut cycle oil is used, higher conversions may be tolerated. For this reason, lower boiling range fractions of that type are preferred. Thus, cycle oils with end points below 650° F. (345° C.), preferably below 600° F. (315° C.) are preferred. Initial boiling point will usually be 300° F. (150° C.) or higher, e.g. 330° F. (165°) or 385° F. (195° C.). Light cycle oils generally contain from about 60 to 80% aromatics and, as a result of the catalytic cracking process, are substantially dealkylated, as described above. Other examples of suitable feedstocks include the dealkylated liquid products from delayed or fluid bed coking processes.

If a cycle oil fraction is to be used, it may be obtained by fractionation of a FRLCO or by adjustment of the cut points on the cracker fractionation column. The light stream will retain the highly aromatic character of the catalytic cracking cycle oils (e.g. greater than 50% aromatics by silica gel separation) but the lighter fractions used will generally exclude the heavier polynuclear aromatics (PNAs—three rings or more) which remain in the higher boiling range fractions so that higher conversions may be attained without excessive catalyst aging or loss of product octane. In addition, the heteroatom contaminants are concentrated in the higher boiling fractions so that the hydrocracking step is operated substantially in their absence and preliminary feed hydrotreating is not necessary.

The use of the dealkylated feeds is a significant feature of the process. It will not produce high octane gasoline from predominantly virgin or straight run oils and which have not been previously dealkylated by processes such as catalytic cracking or coking. If the feed used in the present process has not been previously dealkylated, the large alkyl groups found in the feed will be cracked off during the hydrocracking and will be found in the resulting naphtha fraction. Because these groups are relatively straight chain, a low octane gasoline product will result. Smaller, i.e., $C_1$-$C_3$, alkyl side groups, if present do not appear in the naphtha boiling range products from the hydrocracker (even if conditions are severe enough to remove them) and so they have no effect on product octane. If a mixture of dealkylated and non-dealkylated feedstock is used, the octane number will be intermediate between the octane numbers of the feeds used separately. A mixture of alkylated and dealkylated feedstocks can be used in commercial operation but if so, it is likely that the gasoline will have to be subjected to a reforming process in order to achieve the desired octane.

HYDROCRACKING CONDITIONS

During hydrocracking the objective is to create monocyclic aromatics of high octane value from the aromatics in the feed. Because of this, the degree of saturation during the hydrocracking step must be limited so as to avoid complete hydrogenation of these components. For this reason, relatively low to moderate hydrogen pressures are used, usually not more than 1000 psig (7000 kPa), with minimum pressures usually being about 400 psig (about 2860 kPa), with typical pressures in the range of 600-1000 psig (about 4250-7000 kPa), with the exact pressure selected being dependent upon feed characteristics (aromatic and heteroatom content), catalyst stability and aging resistance and the desired product characteristics. This is particularly the case with light cut LCO feeds which are principally composed of bicyclic aromatics such as naphthalene, benzothiophene, etc. where excessive saturation is definitely not desired. Similarly, because ring opening is also to be limited in order to preserve the aromatic character of the gasoline product, severity (temperature, residence time, conversion) is also limited. Conversion to 385° F.–(195° C. -) gasoline should be below 80 volume percent and preferably below 60 volume percent. Although conversion may exceed 75 volume percent, conversion levels between 40 and 70 volume percent are preferred. Because the absence of heteroatoms and PNAs from the feed reduces catalyst deactivation from heteroatom and PNA induced inhibition and coking, there is a reduced degree of necessity to relate conversion to hydrogen pressure as with the FRLCO feed (see application Ser. No. 825,294). Pressures between 400 and 1000 psig (2860–7000 kPa), usually in the range 600-1000 psig (4250-7000 kPa) with conversions up to 70 volume percent are preferred. Hydrocracking temperatures are typically up to 850° F. (450° C.), commonly with a temperature minimum of about 500° F. or higher. Space velocity will vary with temperature and the desired level of conversion, but will typically be 0.25-2.5 hr.$^{-1}$, more usually 0.5-1.5$^{-1}$ (LHSV, 20° C.). Hydrogen circulation rates of 500–5000 SCF/Bbl (90–900 n.l.l.$^{-1}$) are suitable.

A single stage operation without preliminary hydrotreating is preferred with an LCLCO feed. When the feed contains relatively small proportions of polynuclear aromatics (PNAS) as well as of nitrogen and sulfur containing impurities which can all be handled adequately in a single stage operation. The bulk of the PNA's remain in the higher boiling portion of the cycle oil together with the bulk of the heteroatoms and accordingly do not enter the hydrocracker.

HYDROCRACKER PRODUCTS

As described above, the objective of the present process is to produce a high octane gasoline and low sulfur distillate. The boiling range of the gasoline produced in the hydrocracker will typically be $C_5$—385° F. ($C_5$—196° C.) (end point) but gasolines of higher or lower end points may be encountered, depending on applicable product specifications, e.g. $C_5$—330° F. ($C_5$—165° C.) (end point) or $C_5$—450° F. ($C_5$—232° C.). Distillate product will have a boiling range of about 380°-650° F. In all cases, the gasoline boiling range product may be blended directly into the refinery gasoline pool without reforming or other treatment to improve octane.

The invention will now be illustrated by the following Examples.

EXAMPLES

A 620° F. end-point LCO was upgraded in a fixed bed pilot unit. Properties of the LCO are given in Table 1.

TABLE 1

| Feedstock Properties | |
|---|---|
| General Properties | |
| Gravity, API° | 15.5 |
| Hydrogen, wt % | 9.41 |
| Sulfur, wt % | 3.0 |
| Nitrogen, ppmw | 220 |
| Basic Nitrogen, ppmw | 42 |
| Composition, wt % | |
| Paraffins | 14.3 |
| Naphthenes | 7.4 |
| Aromatics | 78.3 |
| Distillation, ° F. | D86 |
| IBP | 426 |
| 5% | 479 |
| 10% | 481 |
| 30% | 503 |
| 50% | 519 |
| 70% | 537 |
| 90% | 571 |
| 95% | 596 |
| EP | 626 |

Fixed bed conditions were: 45% conversion to 390° F.⁻ at 0.75 LHSV and 900 psig hydrogen pressure.

Five catalysts, designated A, B, C, D, E, whose properties are reported in Table 2, were tested. The preparations of catalysts A, B, C, D, E are described in Examples A, B, C, D, and E, respectively.

TABLE 2

| Catalyst ID | Catalyst Properties | | | | |
|---|---|---|---|---|---|
| | A | B | C | D | E |
| Chemical Analyses, wt % | | | | | |
| Ni | 1.0 | — | 4.1 | 3.9 | 3.6 |
| Co | — | 2.2 | — | — | — |
| Mo | — | 5.5 | 6.3 | 6.9 | — |
| W | 3.4 | — | — | — | 9.4 |
| Physical Properties | | | | | |
| S.A. m²/g | 490 | 460 | 412 | 402 | 391 |
| R.D. g/cc | 2.63 | 2.74 | 2.76 | 2.74 | 2.91 |
| P.D. g/cc | 0.93 | 0.88 | 1.05 | 1.05 | 1.09 |
| P.V. cc/g | 0.70 | 0.78 | 0.59 | 0.59 | 0.58 |
| Avg Pore Dia., Å | 56 | 67 | 57 | 58 | 59 |
| Zeolite Y | | | | | |
| Loading[1], wt % | 75 | 70 | 75 | 75 | 75 |
| Steaming | No | No | No | Yes[3] | Yes[3] |
| Framework Al[2], wt % | 7.2 | 5.8 | 5.7 | 2.5 | 2.6 |
| Binder, wt %[1] (Alumina) | 25 | 30 | 25 | 25 | 25 |
| Ni(Co) to Al ratio[4] | 0.09 | 0.28 | 0.52 | 1.12 | 0.99 |

[1] Prior to metals addition.
[2] Determined by MASNMR; cited on 100% zeolite basis.
[3] 10 hrs at 950° F./1 atm/100% steam.
[4] Calculated with corrections for dilution effect of binder and metals.

EXAMPLE A

Preparation of Catalyst A

Catalyst A was prepared from an extrudate containing 75% USY/25% Al₂O₃ which was impregnated with ammonium metatungstate solution at room temperature and dried 4 hrs. in air at room temperature and then at 250° F. overnight. The USY was a commercially available product from PQ Corporation. It was then calcined at 1000° F. for 3 hrs. in flowing air. The calcined material was impregnated with nickel nitrate solution at room temperature. The nickel containing composition was dried 4 hrs. in air at room temperature and at 250° F. overnight. Lastly, it was calcined at 1000° F. for 3 hrs. in flowing air. The catalyst properties are provided in Table 2.

EXAMPLE B

Preparation of Catalyst B

Pseudoboehmite alumina (30%) and a calcined commercial Ultrastable Y (Z 14US) were mulled and extruded through 1/16" dieplate with 0.09% polyvinylalcohol as extrusion aid (1 pass) and dried at 250° F. overnight. The extrudate was calcined at 1000° F. for 3 hrs. in flowing air; exchanged with 1N NH₄NO₃ solution; dried at 250° F. overnight; and calcined at 1000° F. for 3 hrs. in flowing air. The calcined extrudate was impregnated with ammonium heptamolybdate solution at room temperature, dried 4 hrs. in air at room temperature at 250° F. overnight, and calcined at 1000° F. for 3 hrs. in flowing air. Thereafter it was impregnated with cobalt nitrate solution at room temperature; dried 4 hrs. in air at room temperature and at 250° F. overnight; finally, it was calcined at 1000° F. for 3 hrs. in flowing air. The catalyst properties are provided in Table 2.

EXAMPLE C

Preparation of Catalyst C 75 wt % Ultrastable Y from PQ Corp. and 25 wt % pseudoboehmite alumina was mulled and extruded to 1/16" diameter; dried at 250° F.; calcined at 1000° F. for 3 hrs. in air. The extrudate was impregnated by contact with ammonium heptamolybdate solution at room temperature for 4 hrs; dried at 250° F.; and calcined at 1000° F. for 3 hrs in air. It was impregnated with nickel nitrate solution at room temperature for 4 hrs; dried at 250° F. and calcined at 1000° F. for 3 hrs in air. The catalyst properties are provided in Table 2.

EXAMPLE D

Preparation of Catalyst D

A mixture of 75 wt % USY (commercially available from PQ corporation) and 25 wt % pseudoboehmite alumina was mulled and extruded to 1/16" diameter; dried at 250° F.; calcined at 1000° F. for 3 hrs. in air; and steamed at 950° F. for 10 hrs, 1 ATM, 100% steam. The steamed extrudate was impregnated with ammonium heptamolybdate solution at room temperature 4 hrs; dried at 250° F.; calcined at 1000° F. for 3 hrs. in air; impregnated with nickel nitrate solution at room temperature 4 hrs; dried at 250° F. and calcined at 1000° F. for 3 hrs. in air. The catalyst properties are provided in Table 2.

EXAMPLE E

Preparation of Catalyst E

A mixture of 75 wt % USY (from PQ Corporation) and 25 wt % pseudoboehmite alumina was mulled and extruded at 1/16" diameter; dried at 250° F.; calcined at 1000° F. for 3 hrs. in air.

The calcined extrudate was steamed at 950° F. for 10 hrs, 1 ATM, 100% steam; and then impregnated with ammonium metatungstate solution at room temperature 4 hrs; dried at 250° F.; calcined at 1000° F. for 3 hrs in air; impregnated with nickel nitrate solution at room temperature 4 hrs; dried at 250° F. and calcined at 1000° F. for 3 hrs. in air. The catalyst properties are provided in Table 2.

Figure 1:
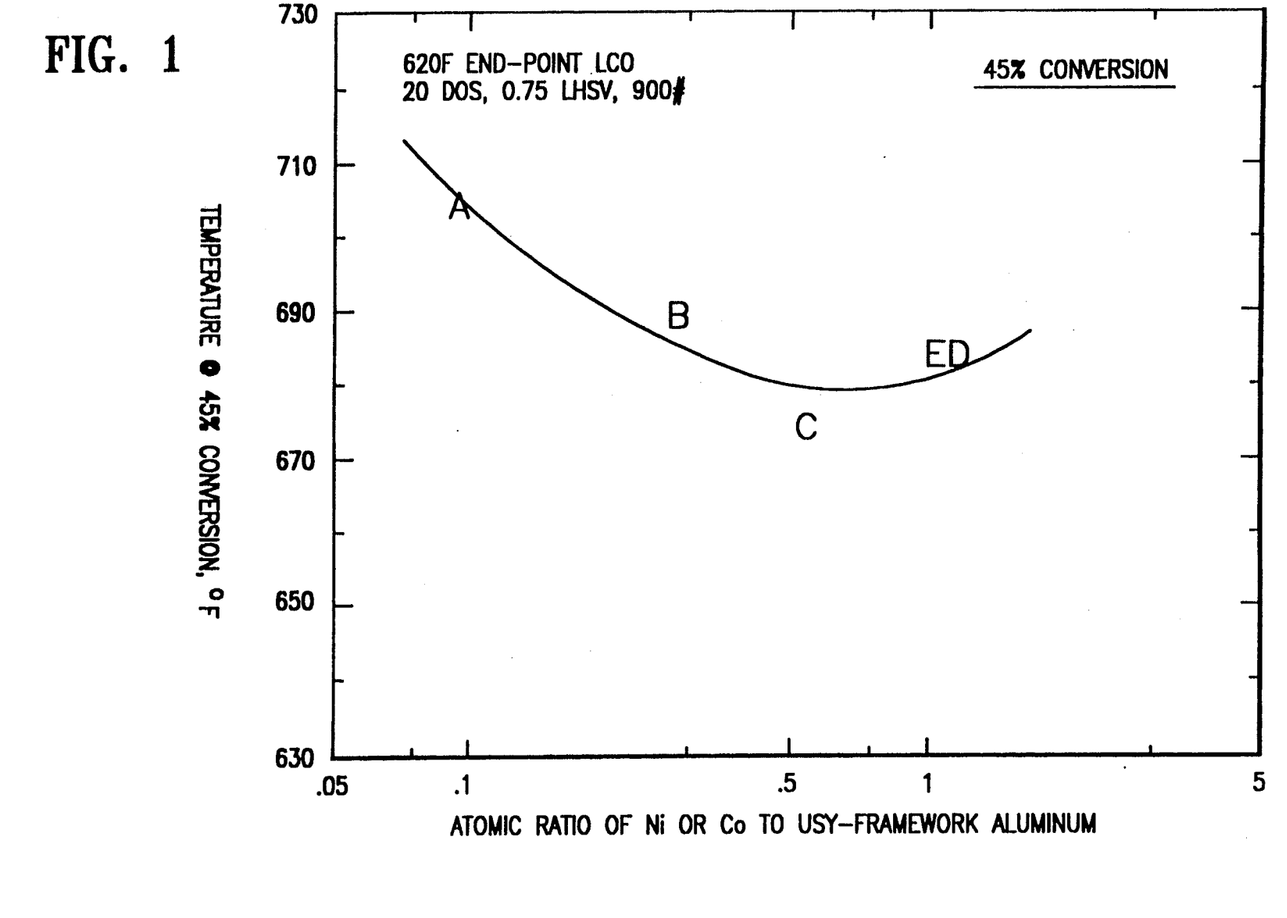
FIG. 1 is a plot of temperature (°F.) at 45% conversion vs. molar ratio of Ni or Co to ultrastable Y-framework aluminum and relates to conversion activity.
Figure 2:
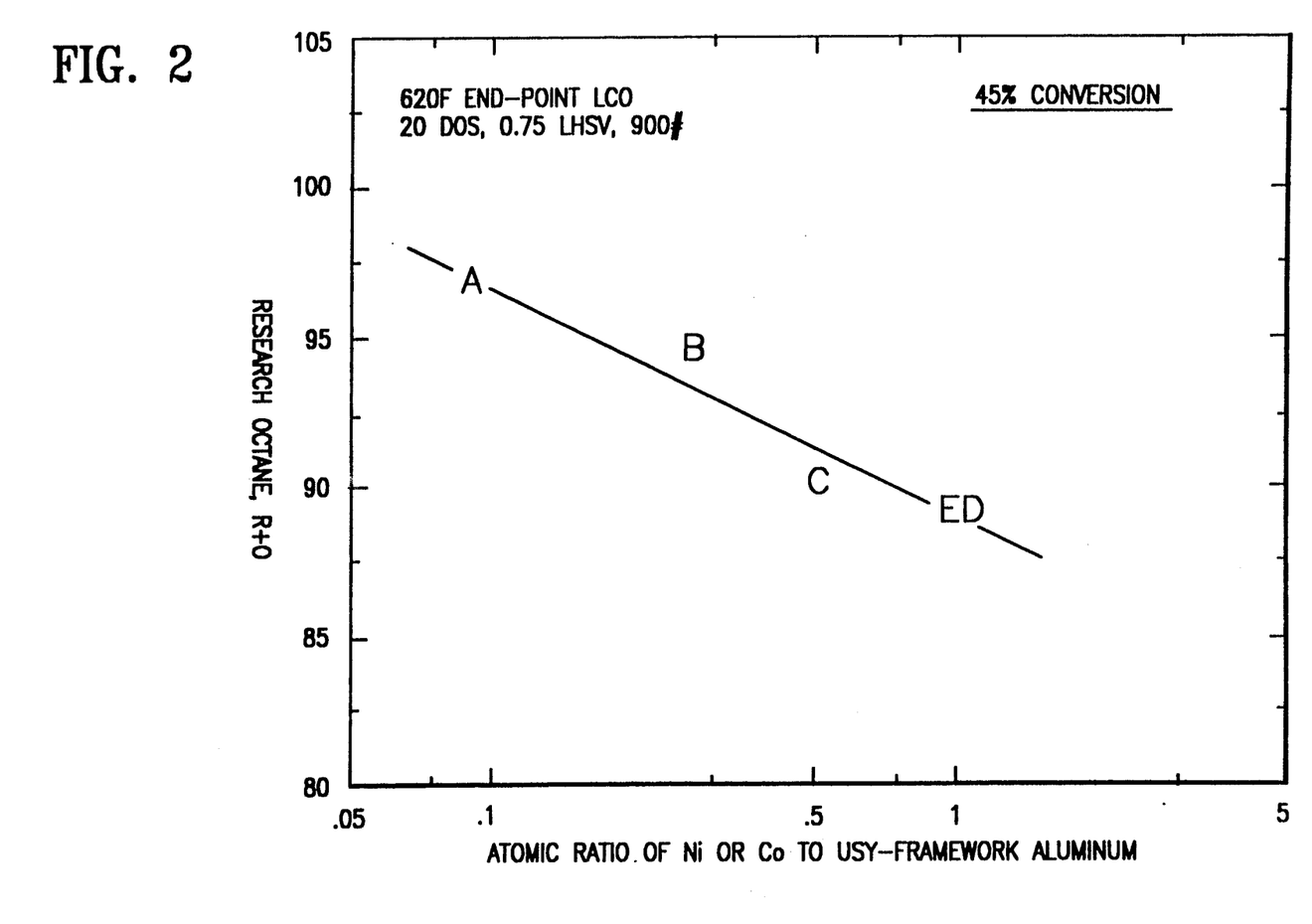
FIG. 2 is a plot of Gasoline Research Octane vs. molar ratio of Ni or Co to ultrastable Y-framework aluminum and relates to gasoline quality.
Figure 3:
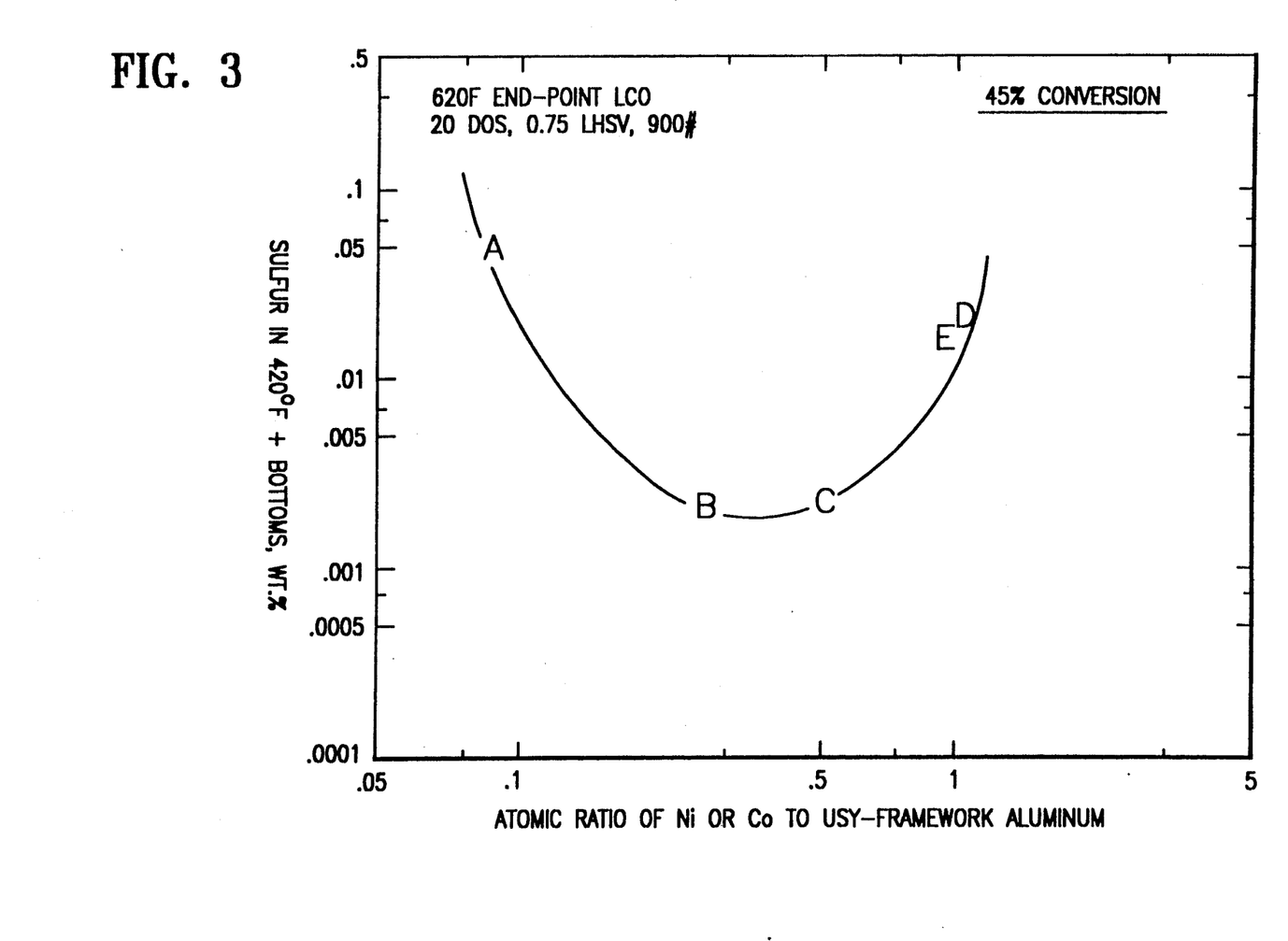
FIG. 3 is a plot of sulfur in 420° F.+Bottoms (weight percent) vs. molar ratio of Ni or Co to ultrastable Y-framework aluminum and relates to distillate quality.

FIG. 1 shows that the catalysts have a maximum conversion activity (lowest temperature requirement) at about 0.5 molar ratio of Group VIII metal/framework Al. At 0.5 molar ratio, catalysts give a gasoline octane of above 90 RON (FIG. 2). Lower octanes at higher molar ratios are believed to be due to excessive hydrogenation activity of the catalyst leading to the hydrogenation of high octane alkylbenzenes to low octane cycloparaffins. In addition, the quality of the unconverted bottoms is critical for commercial application. We have examined one important distillate property: sulfur content. Surprisingly, catalysts with a Group VIII: aluminum (framework) molar ratio between 0.25 and 0.5 give a maximum desulfurization activity (minimum sulfur content in the 420° F+ bottoms, FIG. 3). Based on these results, catalysts with a molar ratio between 0.1 and 0.7 are needed to give the highest distillate quality, sufficient conversion activity and high octane.

We claim:

1. A hydrocracking catalyst consisting essentially of ultrastable Y, a Group VIII metal and a Group VI metal, in a matrix, wherein the Group VIII metal is present in an amount such that a ratio of gram atom mole of Group VIII metal:mole of framework aluminum of said ultrastable Y is less than 2;

wherein the Group VI metal is present in an amount ranging from 0.5 to 25 weight percent of the catalyst; and wherein the ultrastable Y comprises 5 to 80 weight percent of the composition wherein the ratio of gram atom mole of Group VIII metal:mole of framework aluminum of said ultrastable Y is effective to control the activity of the hydrocracking catalyst in accordance with FIG. 1 of the Drawings.

2. The catalyst of claim 1, wherein the ratio is 0.1 to 0.8.

3. The catalyst of claim 1, wherein the ratio is 0.25 to 0.5.

4. The catalyst of claim 1, wherein the Group VIII metal is at least one selected from the group consisting of nickel and cobalt.

5. The catalyst of claim 2, wherein the Group VIII metal is at least one selected from the group consisting of nickel and cobalt.

6. The catalyst of claim 3, wherein the Group VIII metal is at least one selected from the group consisting of nickel and cobalt.

7. The catalyst of claim 1, wherein the Group VI metal is at least one selected from the group consisting of tungsten and molybdenum.

8. The catalyst of claim 4, wherein the Group VI metal is at least one selected from the group consisting of tungsten and molybdenum.

9. The catalyst of claim 5, wherein the Group VI metal is at least one selected from the group consisting of tungsten and molybdenum.

10. A hydrocracking catalyst consisting essentially of ultrastable Y having a framework molar ratio of silica to alumina of at least 5, at least one Group VIII metal and at least one Group VI metal, in a matrix, wherein the Group VIII metal is present in an amount such that a ratio of gram atom mole of Group VIII metal:mole of framework aluminum of said ultrastable Y ranges from 0.1 to 0.8;

wherein the Group VI metal is present in an amount ranging from 0.5 to 25 weight percent of the catalyst; and wherein the ultrastable Y comprises 5 to 80 weight percent of the composition.

11. The catalyst of claim 10, wherein the Group VI metal is at least one selected from the group consisting of tungsten and molybdenum.

12. The catalyst of claim 11, wherein the ratio is 0.1 to 0.7.

13. A hydrocracking catalyst consisting essentially of ultrastable Y having a framework molar ratio of silica to alumina of at least 5, a Group VIII metal and a Group VI metal, in a matrix, wherein the Group VIII metal is at least one selected from the group consisting of nickel and cobalt wherein the Group VIII metal is present in an amount such that a ratio of gram atom mole of Group VIII metal:mole of framework aluminum of said ultrastable Y ranges from 0.25 to 0.5;

wherein the Group VI metal is present in an amount ranging from 0.5 to 25 weight percent of the catalyst; and wherein the ultrastable Y comprises 5 to 80 weight percent of the composition.

14. The catalyst of claim 13, wherein the Group VI metal is at least one selected from the group consisting of tungsten and molybdenum.

15. The hydrocracking catalyst of claim 1, which exhibits a selectivity for research octane as in FIG. 2.

* * * * *